US012445010B2

(12) United States Patent
Tanikawa et al.

(10) Patent No.: US 12,445,010 B2
(45) Date of Patent: Oct. 14, 2025

(54) BALL BEARING HOLDING STRUCTURE AND FAN MOTOR

(71) Applicant: MABUCHI MOTOR CO., LTD., Chiba (JP)

(72) Inventors: Norihisa Tanikawa, Chiba (JP); Kenji Shiraki, Chiba (JP); Sakie Kawakami, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 229 days.

(21) Appl. No.: 18/340,031

(22) Filed: Jun. 23, 2023

(65) Prior Publication Data
US 2023/0421014 A1 Dec. 28, 2023

(30) Foreign Application Priority Data

Jun. 27, 2022 (JP) ................................ 2022-102583

(51) Int. Cl.
*H02K 5/16* (2006.01)
*F16C 19/06* (2006.01)
(Continued)

(52) U.S. Cl.
CPC ........... *H02K 5/1735* (2013.01); *F16C 19/06* (2013.01); *F16C 35/06* (2013.01); *H02K 7/085* (2013.01);
(Continued)

(58) Field of Classification Search
CPC .. H02K 5/00; H02K 5/16; H02K 5/17; H02K 5/173; H02K 5/1732; H02K 5/1735;
(Continued)

(56) References Cited

U.S. PATENT DOCUMENTS

| 5,411,338 A * | 5/1995 | Goto ...................... H02K 7/086 |
| | | 384/537 |
| 6,394,658 B1 * | 5/2002 | Crowell .................. F16C 25/06 |
| | | 384/537 |
| 2013/0187499 A1 | 7/2013 | Watanabe et al. |

FOREIGN PATENT DOCUMENTS

| JP | H03040853 U | 4/1991 |
| JP | H06030541 A | 2/1994 |

(Continued)

OTHER PUBLICATIONS

Office Action in JP Application No. 2022-102583, mailed Sep. 2, 2025, 7pp.

*Primary Examiner* — Tran N Nguyen
(74) *Attorney, Agent, or Firm* — HAUPTMAN HAM, LLP

(57) ABSTRACT

A holding structure includes a bearing holder including a cylindrical holder portion into which a ball bearing is internally fitted from one side in an axial direction of a shaft, and a positioning portion on another side in the axial direction of the holder portion and abutting on the ball bearing; and a mounting plate having a cylindrical mounting portion in which a portion of the holder portion is press-fitted. An inner surface of the holder portion includes an adhesion surface bonded to an outer peripheral surface of the ball bearing, a relief surface having an inner diameter larger than an inner diameter of the adhesion surface, and a step surface connecting the adhesion surface and the relief surface. An axial position of the step surface overlaps the ball bearing engaged to the bearing holder.

7 Claims, 4 Drawing Sheets

(51) Int. Cl.
   *F16C 35/06*    (2006.01)
   *H02K 5/173*    (2006.01)
   *H02K 7/08*     (2006.01)
   *H02K 21/22*    (2006.01)

(52) U.S. Cl.
   CPC .......... *H02K 21/22* (2013.01); *F16C 2380/26* (2013.01)

(58) Field of Classification Search
   CPC ............ H02K 7/00; H02K 7/08; H02K 7/085; H02K 21/00; H02K 21/22; F16C 19/00; F16C 19/06; F16C 35/00; F16C 35/06; F16C 35/07; F16C 35/077; F16C 33/00; F16C 33/38
   See application file for complete search history.

(56) References Cited

FOREIGN PATENT DOCUMENTS

| | | |
|---|---|---|
| JP | H08228453 A | 9/1996 |
| JP | 2013150484 A | 8/2013 |

* cited by examiner

BALL BEARING HOLDING STRUCTURE AND FAN MOTOR

RELATED APPLICATIONS

The present application claims priority to Japanese Application No. 2022-102583 filed Jun. 27, 2022, the disclosure of which is hereby incorporated by reference herein in its entirety.

BACKGROUND

Technical Field

The present disclosure relates to a ball bearing holding structure for rotatably supporting a shaft and a fan motor to which the holding structure is applied.

Related Art

Typically, a ball bearing that rotatably supports a shaft is held on an outer shell and a foundation (base) of a device in which a shaft is provided as a rotating shaft, such as a motor and a speed reducer. For example, JP-A-8-228453 discloses a structure in which a ball bearing is engaged and held in a bearing holder press-fitted and fixed to a base of a spindle motor.

SUMMARY

In the ball bearing holding structure disclosed in JP-A-8-228453, since the bearing holder is press-fitted and fixed to the base, the press-fit portion is deformed radially inward and the space for holding the ball bearing is narrowed. As a result, when the ball bearing is engaged to the bearing holder, the outer ring of the ball bearing is compressed, and the passage space of the ball inside the ball bearing can be deformed. The deformation of the passage space of the ball causes non-uniformization of the passage speed of the ball when the shaft is rotated, leading to the generation of abnormal sound.

In view of such an issue, the object of the present application is to provide a ball bearing holding structure capable of suppressing deformation of a ball bearing that can be caused by the bearing holder being press-fitted and fixed, and a fan motor to which the holding structure is applied. Note that the object is not limited to this, and it is another object of the present application to provide an effect that is derived by each configuration shown in "DETAILED DESCRIPTION" to be described later and that is not obtained by typical techniques.

The disclosed ball bearing holding structure and fan motor may be achieved as aspects or applications disclosed below, and solve at least a portion of the issue described above.

(1) The ball bearing holding structure disclosed here is a ball bearing holding structure that rotatably supports a shaft and includes a bearing holder including a cylindrical holder portion into which the ball bearing is internally fitted from one side in an axial direction of the shaft, and a positioning portion provided on another side in the axial direction of the holder portion and abutting on the ball bearing from the other side; and a mounting plate having a cylindrical mounting portion in which a portion of the holder portion is press-fitted from the other side. an inner surface of the holder portion is provided with an adhesion surface bonded to an outer peripheral surface of the ball bearing by an adhesive, a relief surface having an inner diameter larger than an inner diameter of the adhesion surface on the one side than the adhesion surface, and a step surface connecting the adhesion surface and the relief surface, and the axial position of the step surface is a position overlapping the ball bearing in a state where the ball bearing is engaged to the bearing holder.

(2) In a state where the bearing holder and the mounting plate are combined, an axial position of an end surface on the other side of the mounting portion is preferably a position overlapping the ball bearing. In this case, the axial position of the step surface is preferably a position overlapping both of the mounting portion and the ball bearing.

(3) The inner diameter of the relief surface preferably is larger than a value obtained by adding a tightening margin for press-fitting the holder portion to an outer diameter of the ball bearing.

(4) The outer diameter of the ball bearing is preferably 12 mm, and viscosity of the adhesive is preferably 2000 mPa·s or more and 3000 mPa·s or less. In this case, difference between the outer diameter of the ball bearing and the inner diameter of the relief surface is preferably 150 μm or more and 255 μm or less.

In addition, the fan motor disclosed here includes: a motor portion including a rotor that integrally rotates with a fan portion via a shaft and a stator that is disposed opposite to the rotor, in which the ball bearing holding structure according to any one of (1) to (4) is applied to the ball bearing that rotatably supports a shaft.

The disclosed ball bearing holding structure and fan motor are capable of suppressing ball bearing deformation that can occur during press-fitting and fixing of the bearing holder.

DETAILED DESCRIPTION

Figure 1:
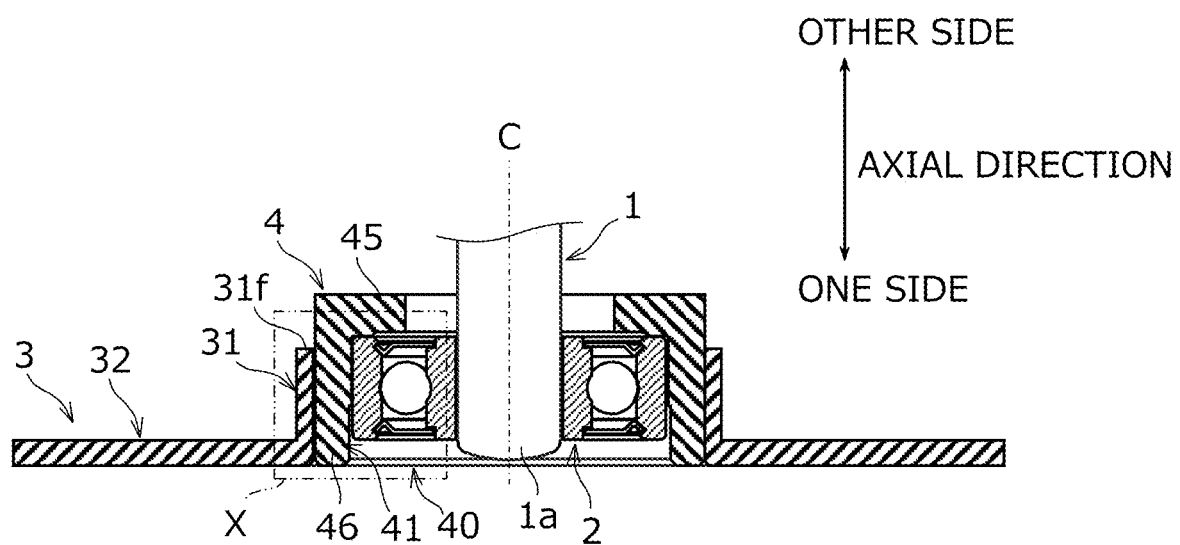
FIG. 1 is an axial cross-sectional view showing a ball bearing holding structure according to an embodiment.

Referring to the drawings, a ball bearing holding structure and a fan motor are described as an embodiment. The following embodiments are merely examples, and are not intended to exclude the application of various modifications and techniques that are not explicitly specified in the following embodiments. Each configuration of the present embodiment can be variously modified and implemented without departing from the spirit. In addition, it may be selected or combined as appropriate.

1. Ball Bearing Holding Structure

Figure 2:
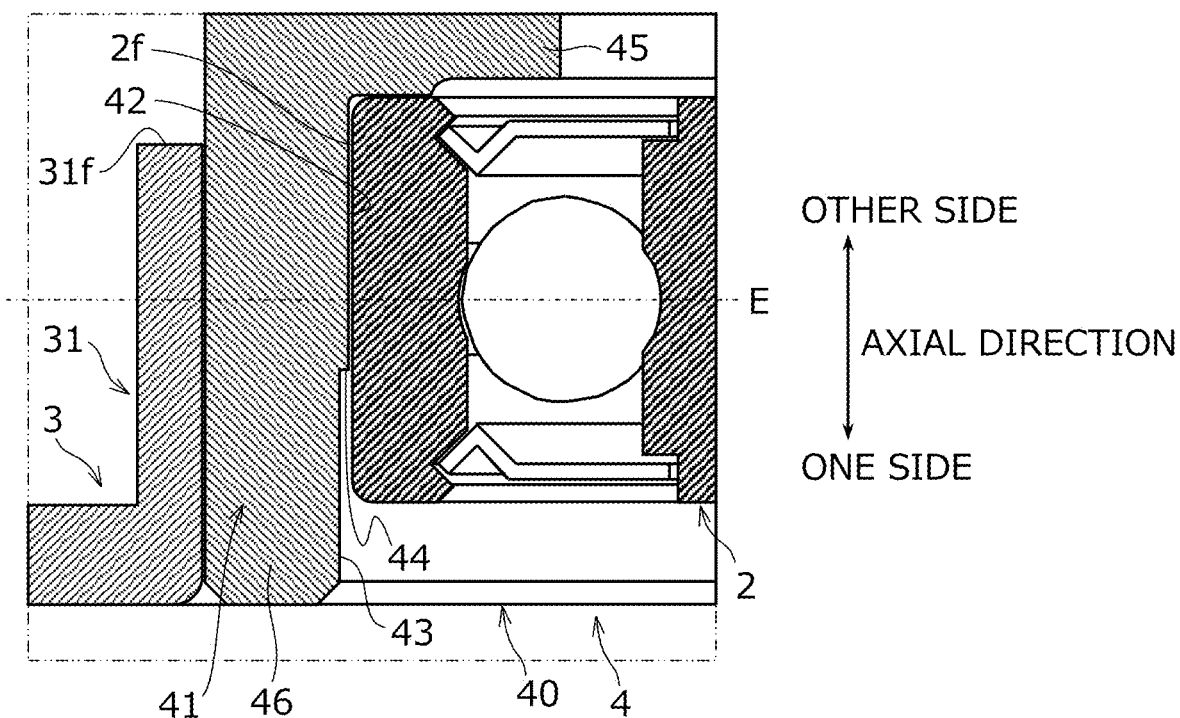
FIG. 2 is an enlarged view of a portion X in FIG. 1.
Figure 3:
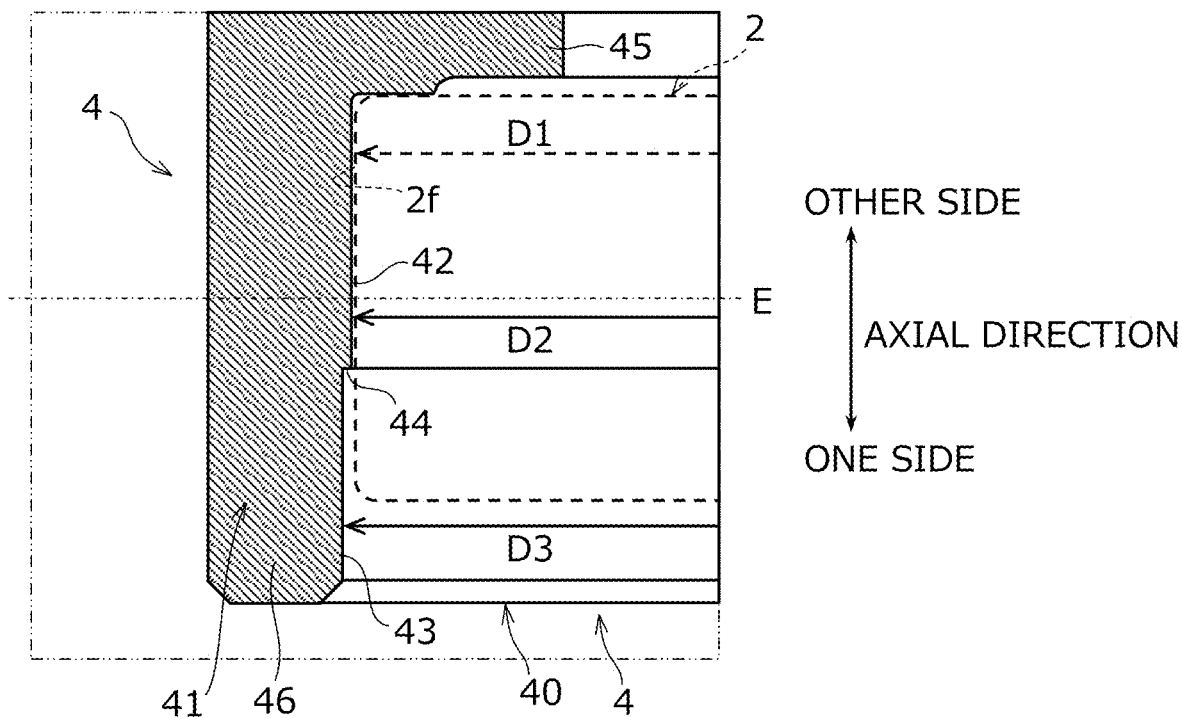
FIG. 3 is an axial cross-sectional view showing a portion of a bearing holder (the portion shown in FIG. 2) of the ball bearing holding structure in FIG. 1 before the bearing holder is press-fitted into a mounting plate.

The ball bearing holding structure (hereinafter simply referred to as "holding structure") of the present embodiment will be described with reference to FIGS. 1 to 3. As shown in FIG. 1, the holding structure of the present embodiment holds a ball bearing 2 (hereinafter simply referred to as "bearing 2") that rotatably supports a shaft 1. Here, the bearing 2 supporting an end portion 1a on one end side (the lower side in FIG. 1) of the shaft 1 is explained. The shaft 1 is fixed and supported by the bearing 2 by press-fitting the end portion 1a on the one end side into the inner ring of the bearing 2. Note that the size of the bearing 2 is not particularly limited, however, for example, a relatively small one having an outer diameter of 12 mm is applied.

Hereinafter, the direction in which a center line C of the shaft 1 extends is referred to as the axial direction, the direction orthogonal to the center line C is referred to as the radial direction, and the direction around the center line C is referred to as the circumferential direction. In the axial direction, one end side of the shaft 1 (the lower side in FIG. 1 at the end portion 1a) is referred to as "one side", and the opposite side (the upper side in the figure) is referred to as the "other side". In addition, in the radial direction, the center line C side is referred to as "inside", and the opposite side (the side away from the center line C) is referred to as "outside".

The holding structure includes a mounting plate 3 and a bearing holder 4. The mounting plate 3 is a member fixed to the outer shell or the foundation (base) of a device (not shown) on which the shaft 1 is provided. Examples of such devices include motors and speed reducers. Note that the mounting plate 3 may be configured as a part of the outer shell or the foundation instead of a body that is different from the outer shell or the foundation of the device. The bearing holder 4 is a member that holds the bearing 2 by bonding the bearing 2 to the inside, and is press-fitted and fixed to the mounting plate 3. The bearing holder 4 and the bearing 2 are bonded by an adhesive. The description of each member 3 and 4 is given below as the state shown in FIG. 1, that is, the state where the bearing 2 supporting the shaft 1 is engaged to the bearing holder 4 and the bearing holder 4 is press-fitted into the mounting plate 3.

As described above, the mounting plate 3 is a member fixed to the outer shell or the foundation of a device on which the shaft 1 is provided. The mounting plate 3 is formed of, for example, an iron-based steel plate such as a galvanized steel plate. However, if the mounting plate 3 is formed of a material having a higher strength than the material forming the bearing holder 4, the material of the mounting plate 3 is not limited to the material described above. The mounting plate 3 is provided with a cylindrical mounting portion 31 into which the bearing holder 4 can be press-fitted. The mounting plate 3 of the present embodiment includes the mounting portion 31 and a base portion 32 connected to one side of the mounting portion 31. The base portion 32 is a plate-like portion extending outward from one side of the mounting portion 31, and is attached to the outer shell or the foundation of the device described above.

The mounting portion 31 is a cylindrical portion extending in the axial direction. Here, the inner peripheral surface and the outer peripheral surface each illustrate the cylindrical mounting portion 31 having a uniform diameter in the axial direction. The center line of the mounting portion 31 matches the center line C of the shaft 1. The end portion 46 (hereinafter referred to as the "one side end portion 46") on one side of the bearing holder 4 is press-fitted and fixed to the mounting portion 31 from the other side. Therefore, in a state before the mounting plate 3 and the bearing holder 4 are combined, the inner diameter of the mounting portion 31 is set smaller than the outer diameter of the one side end portion 46 of the bearing holder 4.

The axial position of an end surface 31f (hereinafter referred to as the "other side end surface 31f") on the other side of the mounting portion 31 is at a position overlapping the ball bearing 2 in the axial direction. In other words, it can be said that the mounting portion 31 extends in the axial direction from a position overlapping the ball bearing 2 in the axial direction toward one side. In the present embodiment, as shown in FIG. 2, the other side end surface 31f is disposed at a position (a position not protruding from the end surface on the other side of the bearing 2 to the other side) that is on the other side of an axial center position E of the bearing 2 and overlaps the bearing 2 in the axial direction. The mounting portion 31 extends axially from the position of the other side end surface 31f to substantially the same position as the end surface of the one side end portion 46 of the bearing holder 4, for example. However, the axial position and length of the mounting portion 31 are not limited this configuration if the bearing holder 4 can be press-fitted and fixed at least to the mounting portion 31.

As described above, the bearing holder 4 is a member press-fitted and fixed to the mounting plate 3 and having the bearing 2 engaged inside. The bearing holder 4 is formed of an aluminum-based material, for example, duralumin, for accurately incorporating the bearing 2 inside. However, the material forming the bearing holder 4 is not limited to duralumin and may be, for example, brass.

The bearing holder 4 includes a cylindrical holder portion 40 into which the bearing 2 is internally fitted, and a positioning portion 45 that defines the axial position of the bearing 2. A part of the holder portion 40 (a portion on one side) is a press-fit portion 41 that is press-fitted into the mounting portion 31, and the press-fit portion 41 includes the one side end portion 46 of the bearing holder 4 described above. Here, the cylindrical holder portion 40 extending in the axial direction and having a center line matching the center line C of the shaft 1 is explained corresponding to the shape of the mounting portion 31 described above. The outer peripheral surface of the holder portion 40 has a uniform outer diameter in the axial direction. When the press-fit portion 41 including the one side end portion 46 is press-fitted into the mounting portion 31, the outer peripheral surface of the press-fit portion 41 is pressed against the inner peripheral surface of the mounting portion 31.

The positioning portion 45 is provided on the other side of the holder portion 40, for example, as a portion projecting inward from the inner peripheral surface of the holder portion 40. The bearing 2 is internally fitted into the holder portion 40 from one side and abuts on the positioning portion 45 to restrict the displacement to the other side to determine its axial position.

In a state before the mounting plate 3 and the bearing holder 4 are combined, the outer diameter of the one side end portion 46 of the bearing holder 4, that is, the outer diameter of the holder portion 40, is set to be larger than the inner diameter of the mounting portion 31 to satisfy the range of the set tightening margin. For example, in a case where the tightening margin (tightening margin for press-fitting) of the holder portion 40 with respect to the mounting portion 31 is set in the range of 35 µm or more and 45 µm or less, the outer diameter of the holder portion 40 is set to be larger than the inner diameter of the mounting portion 31 to satisfy the range. Note that the tightening margin for press-fitting is not limited to the above ranges. However, from the viewpoint of preventing the bearing holder 4 from coming off the mounting plate 3, it is preferable that the tightening margin for press-fitting is set within a range in which coming-off can be prevented.

Here, when the bearing holder 4 is press-fitted into the mounting plate 3, deformation of the above tightening margin for press-fitting occurs inside the holder portion 40. There is an issue that due to this deformation, when the space inside the holder portion 40 is narrowed and the outer ring of the bearing 2 is compressed, the passage space of the ball provided inside the bearing 2 is deformed. The deformation of the passage space of the ball causes non-uniformization of the passage speed of the ball when the shaft 1 is rotated, leading to the generation of abnormal sound. Note that the deformation of the bearing holder 4 increases as the bearing holder 4 is fixed to the mounting plate 3 more firmly, in other words, as the tightening margin for press-fitting is set larger.

Therefore, in the holder portion 40 of the present embodiment, a structure that suppresses the compression of the outer ring of the bearing 2 by press-fitting is provided on the inner surface of the holder portion 40. Specifically, as shown in FIGS. 2 and 3, an adhesion surface 42 bonded to the bearing 2 by an adhesive and a relief surface 43 having an inner diameter larger than the inner diameter of the adhesion surface 42 on one side of the adhesion surface 42 are provided on the inner peripheral surface of the holder portion 40. Furthermore, a step surface 44 connecting the adhesion surface 42 and the relief surface 43 is provided on the inner surface of the holder portion 40. That is, the holder portion 40 has a stepped shape having two inner peripheral surfaces 42 and 43 having different inner diameters as the inner surfaces.

The boundary position between the adhesion surface 42 and the relief surface 43, that is, the axial position of the step surface 44, is a position overlapping the bearing 2. In the present embodiment, the axial position of the step surface 44 is a position overlapping both of the bearing 2 and the mounting portion 31. The deformation of the holder portion due to press-fitting is greater toward one side from the portion where the outer peripheral surface of the holder portion 40 and the inner peripheral surface of the mounting portion 31 are in pressure contact (close contact), that is, the axial position of the other side end surface 31$f$ of the mounting portion 31. Therefore, by setting the axial position of the step surface 44 to overlap both of the bearing 2 and the mounting portion 31, in other words, by providing the relief surface 43 in the range of one side from the position, the compression of the outer ring of the bearing 2 due to the deformation of the holder portion 40 can be suppressed.

Here, the step surface 44 provided on one side of an axial center position E of the bearing 2 is explained. In this manner, the step surface 44 is provided closer to one side than the axial center position E of the bearing 2, securing a wide area of the adhesion surface 42. Therefore, the bonding of the bearing 2 to the holder portion 40 can be more firmly performed.

Note that the axial position of the step surface 44 is not limited to the position described above. For example, in a case where the step surface 44 is provided closer to the other side than the axial center position E of the bearing 2, compression of the outer ring of the bearing 2 at the axial center position E can be further suppressed. Thus, the deformation of the passage space of the ball provided inside the bearing 2 can be further suppressed. The axial position of the step surface 44 may be set based on the results of, for example, by experiment or simulation of where and how much the holder portion 40 is deformed by press-fitting when the holder portion 40 is designed. Note that, in the present embodiment, although the step surface 44 is provided as a plane extending in the radial direction, the step surface 44 may be inclined with respect to the radial direction, for example, and may not be a plane.

When the bearing 2 is engaged to the bearing holder 4, the adhesive is applied to the step surface 44 (or also including the periphery of the step surface 44) and spreads out between an outer peripheral surface 2$f$ of the bearing 2 and the adhesion surface 42 when the bearing 2 is fitted to form a predetermined adhesive film. That is, the step surface 44 of the present embodiment not only connects between the adhesion surface 42 and the relief surface 43, but also has a function as a mark for applying the adhesive. An inner diameter D2 (see FIG. 3) of the adhesion surface 42 is set larger than an outer diameter D1 of the bearing 2 to such a degree that an adhesive film having a suitable thickness can be formed between the adhesion surface 42 and the outer peripheral surface 2$f$ of the bearing 2.

The appropriate thickness varies depending on, for example, the material (viscosity) of the adhesive and the outer diameter D1 of the bearing 2. For example, in a case where a relatively small bearing 2 having an outer diameter of 12 mm is applied, it is assumed the viscosity of the adhesive used is the viscosity of the adhesive recommended for bonding the bearing 2 and the bearing holder 4 [for example, the range of 2000 mPa·s or more and 3000 mPa·s or less at room temperature (about 25° C.)]. In this case, the difference (adhesion margin) between the outer diameter D1 of the bearing 2 and the inner diameter D2 of the adhesion surface 42 is preferably in the range of 1 μm or more and 16 μm or less. Therefore, the inner diameter D2 of the adhesion surface 42 is set to be larger than the outer diameter D1 of the bearing 2 to satisfy the range (1 μm to 16 μm) of the adhesion margin.

An inner diameter D3 of the relief surface 43 is set to be at least larger than the inner diameter D2 of the adhesion surface 42 in a state before the mounting plate 3 and the bearing holder 4 are combined. The inner diameter D3 of the relief surface 43 is preferably set to be larger than the value obtained by adding the tightening margin of the bearing holder 4 to the mounting plate 3 (the tightening margin for press-fitting) to the outer diameter D1 of the bearing 2 (D3>D1+tightening margin).

As described above, when the bearing 2 is engaged to the bearing holder 4, the adhesive is applied to the step surface 44. Therefore, the inner diameter D3 of the relief surface 43 is more preferably set to a value capable of applying an appropriate amount of adhesive on the step surface 44. The value is different mainly depending on the material (viscosity) of the adhesive, and more specifically, depending on the outer diameter D1 of the bearing 2. For example, it is assumed the viscosity of the adhesive is in the range of 2000 mPa·s to 3000 mPa·s at room temperature (approximately 25° C.) and the outer diameter D1 of the bearing 2 is 12 mm. In this case, the difference between the outer diameter D1 of the bearing 2 and the inner diameter D3 of the relief surface 43 is preferably set to be 150 μm or more and 255 μm or less. Note that, here, the inner diameter D3 of the relief surface 43 is defined by the difference with the outer diameter D1 of the bearing 2 instead of the inner diameter D2 of the adhesion surface 42 because the inner diameter D2 of the adhesion surface 42 and the inner diameter D3 of the relief surface 43 are set based on the dimensions and tolerances of the bearing 2, and the adhesion margin is very small with respect to the difference.

As the assembly procedure of the shaft 1, the bearing 2, the mounting plate 3, and the bearing holder 4, for example, after the bearing holder 4 is press-fitted and fixed to the mounting plate 3, the bearing 2 in which the shaft 1 is press-fitted and fixed is engaged to the bearing holder 4. Alternatively, after the bearing holder 4 is press-fitted into the mounting plate 3, the bearing 2 may be engaged to the bearing holder 4, and then the shaft 1 may be press-fitted into the bearing 2. Note that the bearing holder 4 may be press-fitted and fixed to the mounting plate 3 after the mounting plate 3 is assembled to the outer shell or the foundation of the device.

2. Application Example of Ball Bearing Holding Structure

Figure 4:
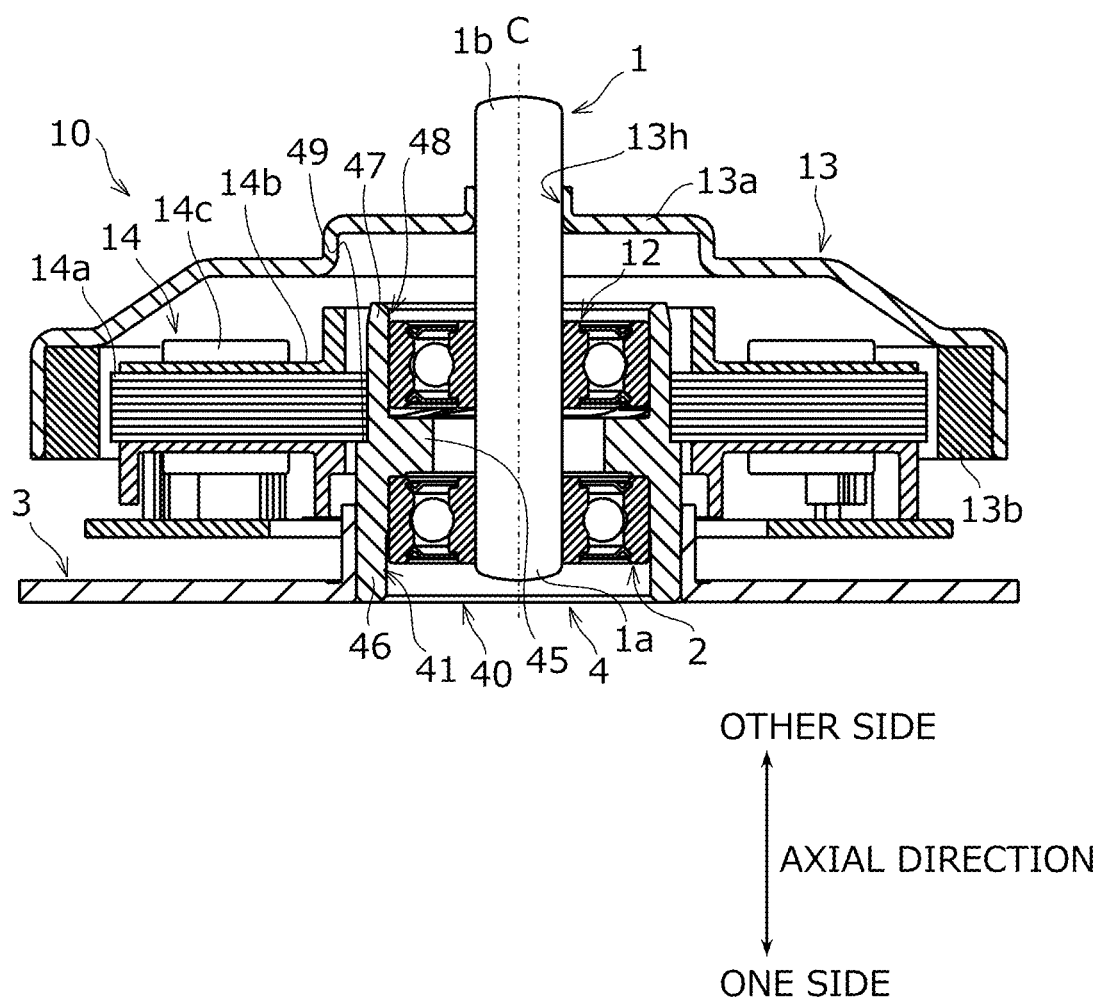
FIG. 4 is an axial sectional view showing a motor portion of a fan motor to which the ball bearing holding structure according to the embodiment is applied.

FIG. 4 is an axial sectional view of a motor portion 10 of a fan motor to which the holding structure of the present embodiment is applied. The fan motor corresponds to the "device in which the shaft 1 is provided". As shown in FIG. 4, the fan motor is provided with two ball bearings 2 and 12 separated from each other in the axial direction of the shaft 1. The holding structure of the present embodiment is applied to hold the ball bearing 2 provided on one axial side (the lower side in the figure) of the two ball bearings 2 and 12. Hereinafter, one of the two ball bearings 2 and 12 provided on one side is referred to as a first bearing 2, and the one provided on the other side in the axial direction (the upper side in the figure) is referred to as a second bearing 12. Note that the center line C of the shaft 1 matches the center line of the fan motor.

The bearing holder 4 of the present embodiment includes both of the two ball bearings 2 and 12. Therefore, the bearing holder 4 is provided with a cylindrical second holder portion 48 for holding the second bearing 12 in addition to the holder portion 40 and the positioning portion 45 described above. The second holder portion 48 extends axially from the positioning portion 45 toward the other side. The outer diameter of another side end portion 47 of the bearing holder 4 including the second holder portion 48 is formed smaller than the outer diameter of the one side end portion 46. In addition, on the outer peripheral surface of the bearing holder 4, a placement surface 49 that connects the outer peripheral surface of the one side end portion 46 and the outer peripheral surface of the other side end portion 47 is provided on a portion overlapping the positioning portion 45 in the axial direction. A stator core 14a to be described latter is placed on the placement surface 49.

The fan motor is, for example, a centrifugal fan that delivers the sucked air to the outside in the radial direction. A fan portion (not shown) provided with a plurality of blades is connected to an end portion 1b on the other side of the shaft 1. The fan motor includes a motor portion 10 having a rotor 13 that integrally rotates with the fan portion via the shaft 1 and a stator 14 that is disposed inside the rotor 13. That is, the fan motor is an outer rotor type brushless motor. The two ball bearings 2 and 12 are disposed inside the stator 14 via the bearing holder 4. The shaft 1 is rotatably supported by the two ball bearings 2 and 12 at the end portion 1a on one side and the axial intermediate portion.

The rotor 13 has a cup-shaped rotor yoke 13a and a magnet 13b fixed to the inner peripheral surface of the rotor yoke 13a. A shaft hole 13h penetrating in the axial direction is formed inside the rotor yoke 13a. The rotor 13 is fixed not to rotate relative to the shaft 1, for example, by press-fitting the shaft 1 into the shaft hole 13h. The magnet 13b includes, for example, a long rectangular rubber magnet. The magnet 13b is formed by joining both ends of the rubber magnet to form an annular shape having an outer diameter equal to or smaller than the inner diameter of the inner peripheral surface of the rotor yoke 13a. Note that the plurality of magnets 13b may be provided at intervals in the circumferential direction along the inner peripheral surface of the rotor yoke 13a. The magnets 13b are disposed to surround the stator core 14a at a position facing the stator core 14a of the stator 14 with a gap in a state where the stator 14 is incorporated inside the rotor 13.

The stator 14 has the annular stator core 14a and a coil 14c wound around the stator core 14a via an insulator 14b. The stator core 14a is an annular laminated core in which a plurality of steel plates of the same shape is laminated. The stator core 14a is externally fitted and fixed to the other side end portion 47 of the bearing holder 4 in a state where the lamination direction of the steel plates is aligned in the axial direction at the center. The fixing method includes a method of bonding the outer peripheral surface of the other side end portion 47 and the inner peripheral surface of the stator core 14a by, for example, an adhesive. The stator core 14a may be fixed to the bearing holder 4 by press-fitting the other side end portion 47 into its inner hole. As a result, the stator 14 is fixed to the outer shell or the foundation of the fan motor that are not shown via the bearing holder 4 and the mounting plate 3.

3. Actions and Effects (1) The holding structure described above is provided with the adhesion surface 42, the relief surface 43 having a larger diameter than the adhesion surface 42, and the step surface 44 connecting these surfaces 42 and 43, as the inner surface of the holder portion 40, and the axial position of the step surface 44 is positioned overlapping the bearing 2. That is, the relief surface 43 is provided on one side in the axial direction from a position overlapping the bearing 2 in the axial direction. This can prevent one side of the outer peripheral surface 2f of the bearing 2 from being compressed to the inner surface of the holder portion 40 due to the deformation of the holder portion 40 caused by a part (press-fit portion 41) of the holder portion 40 being press-fitted and fixed to the mounting portion 31. Therefore, the deformation of the bearing 2 that can be caused by the deformation of the holder portion 40 can be suppressed. Thus, the generation of abnormal sound can be suppressed by keeping the ball passage speed of the bearing 2 constant.

In addition, in the holder portion 40, the adhesive can be applied with the step surface 44 as a mark, in a manner that an adhesive can be applied to an appropriate position. The adhesive spreads out to the other side when the bearing 2 is inserted. Therefore, the adhesive is applied to the step surface 44, which is the base point on one side of the adhesion surface 42, to ensure a wide adhesion area while suppressing the spread of the adhesive to the other side than the bearing 2.

(2) In the holding structure described above, the axial position of the step surface 44 is set at a position overlapping both of the mounting portion 31 and the bearing 2. As described above, the deformation of the holder portion 40 due to press-fitting is greater toward one side from the portion where the outer peripheral surface of the holder portion and the inner peripheral surface of the mounting portion 31 are in pressure contact, that is, the position of the other side end surface 31f of the mounting portion 31. Therefore, the axial position of the step surface 44, which is the base point on the other side of the relief surface 43, is set as one side of the other side end surface 31f and overlaps the bearing 2, that is, a position overlapping both of the bearing 2 and the mounting portion 31, in a manner that the deformation amount (compression amount) of the holder portion can be suppressed, and the deformation of the outer ring of the bearing 2 due to the deformation can be further suppressed.

(3) In the holding structure described above, the inner diameter D3 of the relief surface 43 is set to be larger than the value obtained by adding the tightening margin for press-fitting to the outer diameter D1 of the bearing 2. The holder portion 40 is compressed and deformed when the holder portion 40 is press-fitted and fixed to the mounting portion 31, but the deformation amount (compression amount) does not exceed the tightening margin for press-fitting. That is, even if the holder portion 40 is deformed, the deformation of the bearing 2 internally fitted to the holder portion 40 is more reliably suppressed by setting the inner diameter D3 of the relief surface 43 to be larger than the value obtained by adding the tightening margin for press-fitting to the outer diameter D1 of the bearing 2, since the deformation is only within the range of the deformation amount smaller than the tightening margin.

(4) In the holding structure described above, in a case where the outer diameter D1 of the bearing 2 is 12 mm and the viscosity of the adhesive is 2000 mPa·s or more and 3000 mPa·s or less, the difference between the outer diameter D1 of the bearing 2 and the inner diameter D3 of the relief surface 43 is set to 150 μm or more and 255 μm or less. As a result, in the holding structure to which the relatively small bearing 2 having an outer diameter of 12 mm is applied, an appropriate amount of adhesive can be applied to the step surface 44 to form a proper adhesive film. Therefore, the adhesion between the bearing 2 and the adhesion surface 42 can be more reliably achieved.

(5) In the holding structure described above, the bearing holder 4 is firmly fixed to the mounting plate 3 by press-fitting, and the inner surface of the bearing holder 4 is provided with a structure that suppresses deformation of the bearing 2 that can occur when the bearing holder 4 is press-fitted and fixed. Therefore, by applying the holding structure described above to the fan motor, the shaft 1 fixed to the mounting plate 3 via the bearing holder 4, the rotor 13 rotating integrally with the shaft 1, and the fan portion are prevented from coming off, and abnormal sound from the fan motor can be suppressed. Note that, in the fan motor described above, not only the shaft 1, the fan portion, and the rotor 13, but also the stator 14 is fixed to the mounting plate 3 via the bearing holder 4. Therefore, the stator 14 can be prevented from coming off in the fan motor to which the holding structure described above is applied.

4. Others

The configuration of the ball bearing holding structure and the fan motor described in the above embodiment is an example, and is not limited to the one described above. The fan motor may not be a centrifugal fan or an outer rotor type brushless motor. The fan motor may be, for example, an axial-flow fan that flows fluid in the axial direction of the shaft 1. The device to which the ball bearing holding structure is applied may be a device in which the shaft 1 is provided, and is not limited to the fan motor.

The adhesion margin between the bearing 2 and the adhesion surface 42 is not limited to the value range (1 μm to 16 μm) described above, and may be appropriately set according to the viscosity of the adhesive or the outer diameter D1 of the bearing 2. For example, it is assumed that the adhesive to be used has a medium viscosity or a high viscosity with a lower limit value larger than the upper limit value (3000 mPa·s) of viscosity described above. In this case, the range of the adhesion margin may be set within a predetermined range (a lower limit value larger than 1 μm and a range of an upper limit value larger than 16 μm) of a value larger than the above range (1 μm to 16 μm). In addition, for example, in a case where a bearing having an outer diameter larger than the bearing 2 described above is applied to the present holding structure, the range of the adhesion margin may be set within a predetermined range (a lower limit value larger than 1 μm and a range of an upper limit value larger than 16 μm) of a value larger than the above range (1 μm to 16 μm).

Similarly, the difference between the outer diameter D1 of the bearing 2 and the inner diameter D3 of the relief surface 43 is not limited to the range (150 μm to 255 μm) described above, and may be appropriately set according to, for example, the viscosity of the adhesive or the outer diameter D1 of the bearing 2. The inner diameter D3 of the relief surface 43 may be at least larger than the inner diameter D2 of the adhesion surface 42, and is not limited to the setting value described above.

The tightening margin for press-fitting between the mounting plate 3 and the bearing holder 4 is not limited to the above ranges. For example, the tightening margin for press-fitting may be appropriately set according to the outer diameter D1 of the bearing 2. For example, it is assumed that a bearing having an outer diameter larger than the bearing 2 described above is applied to the present holding structure. In this case, the tightening margin for press-fitting may be set within a predetermined range (a lower limit value larger than 35 μm and a range of an upper limit value larger than 45 μm) of a value larger than the above range (35 μm to 45 μm). In addition, the tightening margin may be appropriately set according to the weight of the component held by the mounting plate 3 via the bearing holder 4. The component held includes, for example, the bearing 2, the shaft 1, a component supported by the shaft 1 (for example, the rotor 13), and another component fixed to the mounting plate 3 via the bearing holder 4 (for example, a stator 14). The tightening margin may be appropriately set to satisfy the required fastening force according to the use condition of the device to which the present holding structure is applied (external force such as external vibration caused by the place of use).

The shape of the mounting plate 3 is not limited to the shape described above if the mounting plate 3 has the mounting portion 31. For example, the base portion 32 may be provided to close the inner hole of the mounting portion 31 from one side of the mounting portion 31. The base portion 32 may extend outward from the other side of the mounting portion 31, and may extend outward from the entire outer peripheral surface of the mounting portion 31. In addition, for example, in a case where the plate thickness of the base portion 32 is large, the hole itself formed by penetrating the base portion 32 in the plate thickness direction may be the mounting portion 31. Note that the base portion 32 may be omitted.

The shape of the mounting portion 31 is not limited to a cylindrical shape, and may have a shape in which the holder portion 40 can be press-fitted inside. Similarly, the shape of the holder portion 40 is not limited to a cylindrical shape. The holder portion 40 may have a shape that can be press-fitted into the mounting portion 31 and in which the bearing 2 can be fitted inside. Note that, in the holding structure shown in FIG. 1, the base portion 32 (end portion on one side of the mounting portion 31) of the mounting plate 3 and the end surface of the one side end portion 46 of the holder portion 40 are flush, but the one side end portion 46 may project to one side of the base portion 32 or may be positioned on the other side of the base portion 32.

The positioning portion 45 of the holder portion 40 is not limited to the above as long as it abuts on the bearing 2 from the other side and restricts displacement to the other side of the bearing 2. For example, the positioning portion 45 may be configured as a bottom surface portion that closes the inner hole of the holder portion 40 from the other side of the holder portion 40. In this case, the bearing 2 may rotatably support the end portion on the other side of the shaft 1. In addition, the positioning portion 45 may be configured as a separate member from the holder portion 40.

DESCRIPTION OF REFERENCE SIGNS 1 shaft
2 bearing (first bearing, ball bearing)
2f outer peripheral surface
3 mounting plate
4 bearing holder
10 motor portion
13 rotor
14 stator
31 mounting portion
31f other side end surface (end surface on other side of mounting portion)
40 holder portion
41 press-fit portion (a part of holder portion)
42 adhesion surface
43 relief surface
44 step surface
45 positioning portion
D1 outer diameter of bearing
D2 inner diameter of adhesion surface
D3 inner diameter of relief surface

What is claimed is:

1. A ball bearing holding structure for rotatably supporting a shaft, the ball bearing holding structure comprising:
a bearing holder including a cylindrical holder portion into which the ball bearing is internally fitted from one side in an axial direction of the shaft, and a positioning portion provided on an other side in the axial direction of the holder portion and abutting on the ball bearing from the other side; and
a mounting plate having a cylindrical mounting portion in which a portion of the holder portion is press-fitted from the other side, wherein
an inner surface of the holder portion is provided with an adhesion surface, a relief surface and a step surface; wherein the adhesion surface bonded to an outer peripheral surface of the ball bearing by an adhesive, the relief surface having an inner diameter larger than an inner diameter of the adhesion surface on the one side, and the step surface connecting the adhesion surface and the relief surface, and an axial position of the step surface is a position overlapping the ball bearing in a state wherein the ball bearing is engaged to the bearing holder.

2. The ball bearing holding structure according to claim 1, wherein
in a state wherein the bearing holder and the mounting plate are combined,
an axial position of an end surface on the other side of the mounting portion is a position overlapping the ball bearing, and
the axial position of the step surface is a position overlapping both of the mounting portion and the ball bearing.

3. The ball bearing holding structure according to claim 1, wherein
the inner diameter of the relief surface is larger than a value obtained by adding a tightening margin for press-fitting the holder portion to an outer diameter of the ball bearing.

4. The ball bearing holding structure according to claim 2, wherein
the inner diameter of the relief surface is larger than a value obtained by adding a tightening margin for press-fitting the holder portion to an outer diameter of the ball bearing.

5. The ball bearing holding structure according to claim 1, wherein
the outer diameter of the ball bearing is 12 mm,
viscosity of the adhesive is 2000 mPa·s or more and 3000 mPa·s or less, and
difference between the outer diameter of the ball bearing and the inner diameter of the relief surface is 150 μm or more and 255 μm or less.

6. A fan motor comprising:
a motor portion including a rotor that integrally rotates with a fan portion via a shaft and a stator that is disposed opposite to the rotor, wherein
the ball bearing holding structure according to claim 1 is applied to the ball bearing that rotatably supports a shaft.

7. A fan motor comprising:
a motor portion including a rotor that integrally rotates with a fan portion via a shaft and a stator that is disposed opposite to the rotor, wherein
the ball bearing holding structure according to claim 5 is applied to the ball bearing that rotatably supports a shaft.

* * * * *